US010119352B2

(12) United States Patent
Holmes et al.

(10) Patent No.: US 10,119,352 B2
(45) Date of Patent: Nov. 6, 2018

(54) DIRECT HYDRAULIC RAPID RESPONSE MODULE APPARATUS AND METHOD

(71) Applicant: FMC Technologies, Inc., Houston, TX (US)

(72) Inventors: Lewis Holmes, Houston, TX (US); Iain G. Duncan, Houston, TX (US); Kevin Masterson, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 15/319,942

(22) PCT Filed: Jun. 17, 2015

(86) PCT No.: PCT/US2015/036244
§ 371 (c)(1),
(2) Date: Dec. 19, 2016

(87) PCT Pub. No.: WO2015/195810
PCT Pub. Date: Dec. 23, 2015

(65) Prior Publication Data
US 2017/0138141 A1 May 18, 2017

Related U.S. Application Data

(60) Provisional application No. 62/014,445, filed on Jun. 19, 2014.

(51) Int. Cl.
E21B 34/04 (2006.01)
F15B 1/04 (2006.01)
(Continued)

(52) U.S. Cl.
CPC .......... E21B 33/0355 (2013.01); E21B 34/04 (2013.01); F15B 1/04 (2013.01); F15B 13/024 (2013.01)

(58) Field of Classification Search
CPC ................................... E21B 33/0355
See application file for complete search history.

(56) References Cited

U.S. PATENT DOCUMENTS 4,041,970 A * 8/1977 Peters ..................... F15B 11/06
137/102
5,070,900 A * 12/1991 Johnson ................. F16K 17/10
137/458

(Continued)

FOREIGN PATENT DOCUMENTS

WO 99/31426 A1 6/1999
WO 00/52370 A1 9/2000

OTHER PUBLICATIONS

International Search Report issued in PCT/US2015/036244 dated Jan. 28, 2016 (5 pages).

(Continued)

Primary Examiner — James G Sayre
Assistant Examiner — Douglas S Wood
(74) Attorney, Agent, or Firm — Osha Liang LLP

(57) ABSTRACT

An apparatus, fixed or recoverable to control a remote device includes a valve assembly having a cylinder, a piston dividing the cylinder into a first hydraulic chamber and a second hydraulic chamber, a spring to bias the piston toward the first hydraulic chamber, and a linkage to connect the piston to the remote device, a quick-vent valve assembly comprising an inlet connected to a hydraulic source, an outlet connected to the first hydraulic chamber, and a vent port, wherein the quick-vent valve assembly is configured to discharge fluid from the outlet to the vent when a pressure of the hydraulic source connected to the inlet drops below a threshold value, and a vent line connecting the vent port of the quick-vent valve assembly to a hydraulic accumulator.

21 Claims, 12 Drawing Sheets

(51) Int. Cl.
*E21B 33/035* (2006.01)
*F15B 13/02* (2006.01)

(56) References Cited

U.S. PATENT DOCUMENTS

| | | | | |
|---|---|---|---|---|
| 6,053,202 | A * | 4/2000 | Cunningham | E21B 34/10 137/596.16 |
| 8,474,253 | B2 * | 7/2013 | Askeland | F15B 1/24 60/398 |
| 8,857,175 | B2 * | 10/2014 | Geiger | E21B 33/0355 60/534 |
| 9,464,644 | B2 * | 10/2016 | Schwacke | F15B 15/1409 |
| 9,631,455 | B2 * | 4/2017 | Geiger | E21B 33/0355 |
| 2002/0100501 | A1 | 8/2002 | Hollister et al. | |
| 2008/0264646 | A1 * | 10/2008 | Sten-Halvorsen | E21B 33/0355 166/360 |
| 2013/0161145 | A1 | 6/2013 | Froehlich et al. | |
| 2014/0048274 | A1 | 2/2014 | Reynolds et al. | |

OTHER PUBLICATIONS

Written Opinion of the International Searching Authority issued in PCT/US2015/036244 dated Jan. 28, 2016 (9 pages).
Examiner's Requisition issued in Canadian Application No. 2,952,803; dated Oct. 17, 2017 (5 pages).
Examination Report issued in Australian Patent Application No. 2015277192 dated Jun. 21, 2017 (3 pages).
Written Opinion issued in Singapore Application No. 11201610617R; dated Dec. 21, 2017 (7 pages).

* cited by examiner

DIRECT HYDRAULIC RAPID RESPONSE MODULE APPARATUS AND METHOD

BACKGROUND OF THE DISCLOSURE

Field of the Disclosure

The present disclosure generally relates to apparatus and methods to directly control hydraulically-operated valves from remote locations. More particularly, the present disclosure relates to apparatus and methods to directly control devices operated by hydraulically-operated valves from remote locations over great distances at rapid speed and reduced latency. More particularly still, the present disclosure relates to apparatus and methods to directly control multiple subsea oilfield devices using hydraulically-operated valves at high speed from remote monitoring locations.

Description of the Related Art

In land-based oilfield production systems, retrieval and storage of the produced hydrocarbons (either in liquid or gaseous form) is relatively simple because surface tanks, pipelines, and valves may be constructed, filled, emptied, operated and monitored in-situ or remotely with relative ease. However, for subsea production systems, these tasks may be complicated by fact that production "trees" may be positioned atop subsea wellheads located beneath hundreds or thousands of feet of water upon the sea floor. Because of their location and large number, such installations may not be cost effectively monitored and manipulated by hand (either through the use of divers or remotely operated vehicles, or "ROVs"). As a result, hydraulic control systems may be used to monitor and control the various valves of a subsea tree installation from a remote location, either on-shore or at a centralized off-shore production facility (e.g., a platform or a ship).

In any given subsea production tree system, a plurality of valves may be used to control the production (and safety) of the hydrocarbons being produced. The most common types of hydraulically-operable valves used in hydrocarbon production are shutoff valves and choke (i.e., regulator) valves. Shutoff valves generally operate between two positions, fully open and fully closed and are often used as safety valves for rapidly closing off or "shutting in" the well either for routine maintenance or in the event of an emergency such as a hurricane or other weather event. In contrast, choke valves operate to regulate or vary the amount and flow of the hydrocarbons being produced from the subterranean or subsea wellbore. For example, as a reservoir is produced, the pressure may drop over a period of time. In such case, a choke valve may need to be set to be more restrictive of the flow of hydrocarbons in the early days of production than in the later days of production. Additionally, in certain circumstances, particularly when so-called 4-D fluid modeling is used, it may be advantageous to one wellhead to temporarily increase or restrict flow at a neighboring wellhead. Thus, the control of such "on-off" shutoff valves and their choke valve counterparts at a remote location is desirable throughout the life of the well.

For most installations, shutoff valves are designed to be maintained in an open position by hydraulic signal pressure and spring biased to default to the closed position should the signal pressure be lost. This configuration is based on the premise that should communication with the remote location be lost, it is safest for the valves to close and shut off the production of fluids. Conversely, choke valves may be operated through a series of hydraulic pulses sent from the remote location to instruct the choke valve in adjusting the regulation of produced fluids. In one example, an open/close choke operation valve may be "pulsed" open and closed to send control instructions to the hydraulic choke. Such arrangement may be referred to as a "stepped actuator" choke whereby the choke valve is configured to open or close a set increment for each open/close stroke received from the choke operation valve in communication therewith. Because the choke valve may be operated in two directions (i.e., opening and closing), a first stepped actuator may be used to operate the choke in an opening direction while a second stepped actuator may be used to operate the choke in a closing direction. Thus, similar valves may be used in both shutoff and variable choke applications using hydraulic remote control.

Generally, there are various different types of hydraulic control systems presently in use for remote control of subsea production tree valves. The first and least expensive to operate involves the control of each hydraulic valve directly from a remote location. In such "direct" systems, a single hydraulic conduit extends from each valve of the subsea tree to be operated to the remote location through a bundle of conduits commonly referred to as an "umbilical." While these direct control systems are relatively simple and low-cost, they can be limited by the size and length of the umbilical needed. In particular, because each valve must be directly operated by its own conduit, the size (i.e., diameter) of the umbilical may increase to an unwieldy size if a production tree requires too many valves. Additionally, for applications where the umbilical must span large distances (e.g., over 1.5 km) between the production tree and the remote location, the time it takes to send pressure signals between the two locations may be negatively impacted by hydraulic friction (i.e., the viscosity of the hydraulic fluid) against the inner surface area of the conduit. While it may be possible to increase the diameter of the control conduits for such long distances, doing so may make the size of the overall umbilical excessively large or prohibitively expensive. Because there are regulatory restrictions regarding the minimum amount of time a subsea production shutoff valve may take to close once instructed, the use of such direct control systems may be limited by the distance between the valves to be operated and the remote location controlling them.

In the alternative, a multiplex or "MUX" hydraulic control system may be used. In a MUX installation, many hydraulically-operated devices may be controlled by a single hydraulic conduit extending from the wellhead to the remote location. A series of digitized or "multiplexed" pulses may be transmitted from the remote location where they are de-multiplexed or "de-MUXed" at the wellhead and separated into their individual signal conduits for each hydraulic device. Because the umbilical of a MUX installation may only contain a single hydraulic signal, the conduit may be sized sufficient to reduce any latency in the transmission that might otherwise result in a direct hydraulic control system of similar length/depth. However, while MUX systems are highly effective, they are relatively more expensive, as a significant amount of engineering must be invested to modulate and demodulate the hydraulic pulses into their component signals. Because of their expense, MUX systems are frequently used in deep water drilling and production environments where relative inaccessibility of the wellhead and the anticipated amount of production fluids are significant enough to justify their expense.

Thus, a control system capable of directly (and quickly) controlling subsea hydraulic valves over large distances would be highly desirable.

SUMMARY OF THE CLAIMED SUBJECT MATTER

In one aspect, the present disclosure relates to an apparatus to control a remote device including a valve assembly including a cylinder, a piston dividing the cylinder into a first hydraulic chamber and a second hydraulic chamber, a spring to bias the piston toward the first hydraulic chamber, and a linkage to connect the piston to the remote device, a quick-vent valve assembly comprising an inlet connected to a hydraulic source, an outlet connected to the first hydraulic chamber, and a vent port, wherein the quick-vent valve assembly is configured to discharge fluid from the outlet to the vent when a pressure of the hydraulic source connected to the inlet drops below a threshold value, and a vent line connecting the vent port of the quick-vent valve assembly to a hydraulic accumulator.

In another aspect, the present disclosure relates to a modular valve carrier to engage and complete a subsea valve assembly including an engagement portion of the modular valve carrier having a mechanical connector and a plurality of hydraulic quick-connectors, wherein the engagement portion is configured to engage a corresponding socket of the subsea valve assembly a plurality of quick-vent valve assemblies, each of the plurality of quick-vent valve assemblies including an inlet, an outlet, and a vent port, each inlet, outlet, and vent port hydraulically connected to one of the plurality of hydraulic quick-connectors, and a lifting feature configured to be manipulated by a remotely operated vehicle, wherein each of the plurality of the quick-vent valve assemblies is configured to discharge fluid from the outlet to the vent when a pressure of the hydraulic source connected to the inlet drops below a threshold value.

In another aspect, the present disclosure relates to a method to directly control a remote device including linking the remote device to a piston configured to reciprocate between a first hydraulic chamber and a second hydraulic chamber of a cylinder, hydraulically coupling an outlet of a quick-valve assembly to the first hydraulic chamber, increasing pressure of a hydraulic fluid at an inlet of the quick-valve assembly beyond an opening pressure, thrusting the piston from the first hydraulic chamber to the second hydraulic chamber with the hydraulic fluid increased beyond the opening pressure from the inlet to operate the linked remote device, and venting hydraulic fluid contained within the first hydraulic chamber to a hydraulic accumulator through a vent port of the quick-vent valve assembly when pressure of the hydraulic fluid at the inlet drops below a threshold value to thrust the piston from the second hydraulic chamber to the first hydraulic chamber.

BRIEF DESCRIPTION OF DRAWINGS

Features of the present disclosure will become more apparent from the following description in conjunction with the accompanying drawings.

DETAILED DESCRIPTION

Embodiments disclosed herein relate to apparatus and methods to directly control hydraulically-operated valves from remote locations. In particular, embodiments disclosed herein relate to methods and apparatus to directly and hydraulically control subsea valves (including production shutoff and choke valves) from monitoring and control locations positioned more than 1.5 kilometers from the subsea valves. These apparatus and methods include using quick-vent valve assemblies to permit precise and rapid control of subsea valves located at distal ends of lengthy hydraulic conduits, that might otherwise require significantly longer time to open and/or close if their hydraulic fluids were to be vented all the way back to the control location. In selected embodiments, the quick-vent valves are positioned proximate to subsea valves they are to operate so that as soon as a pressure signal to de-pressurize a subsea valve is received, the quick-vent valves divert the pressure from the subsea valve to a hydraulic accumulator located proximate to the subsea valve. By venting the subsea valves locally (using remote pressure signaling), the operation (i.e., opening or closing) of the subsea valves proceeds more rapidly and quickly that would be possible if the subsea valves were vented traditionally.

Figure 1A:
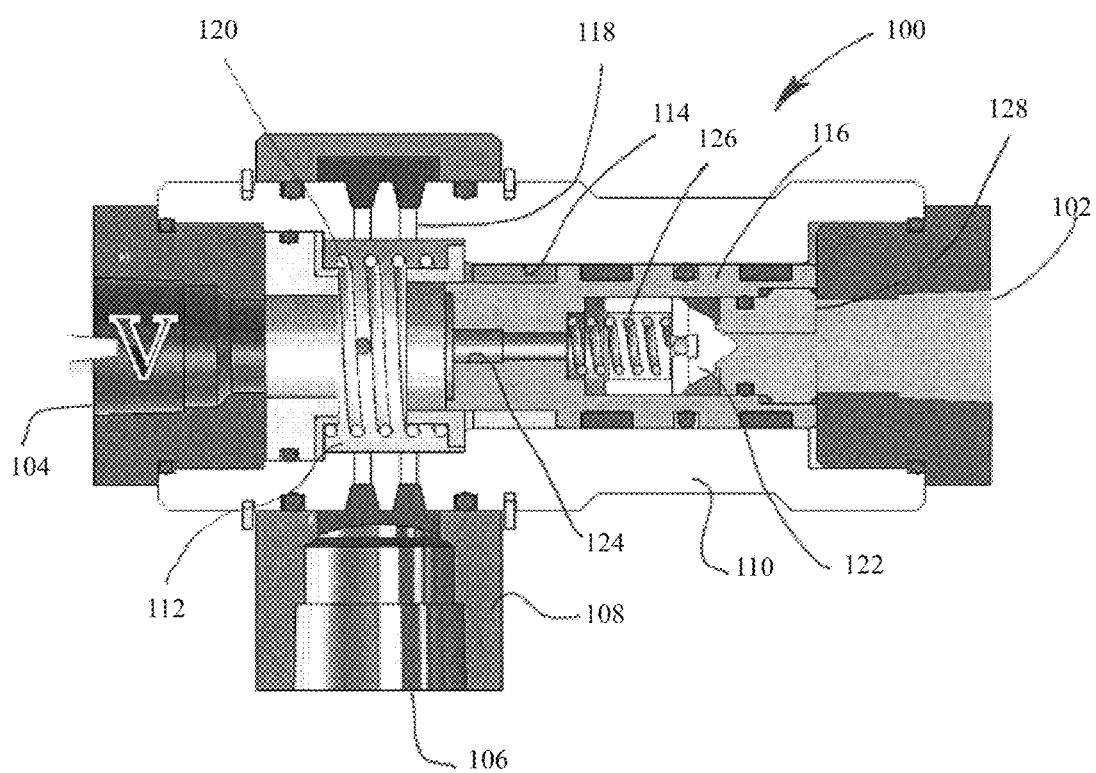
FIGS. 1A through 1D are section-view drawings of a quick-vent valve assembly capable of being used in accordance with embodiments of the present disclosure.
Figure 1B:
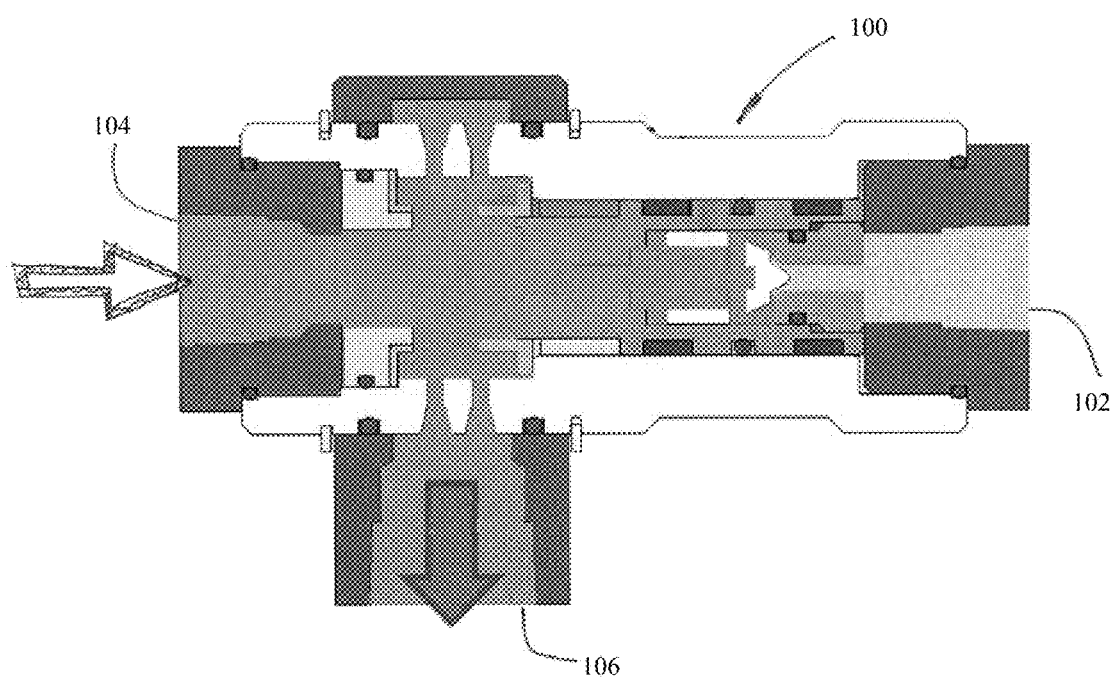
Figure 1C:
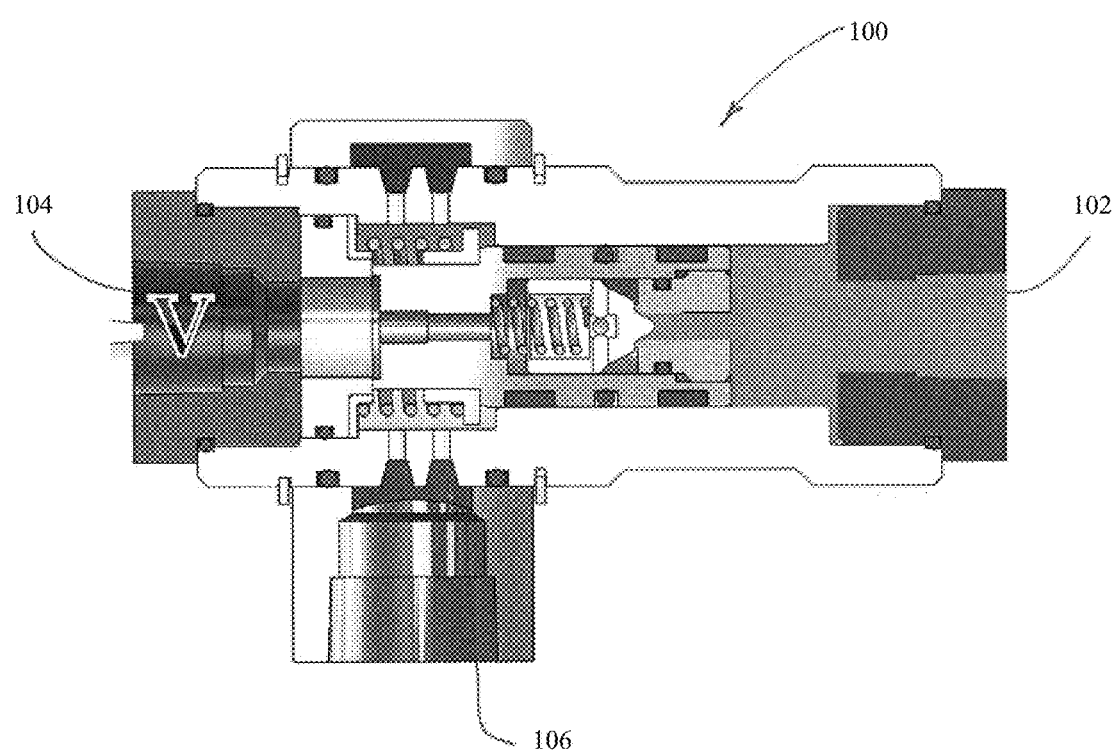
Figure 1D:
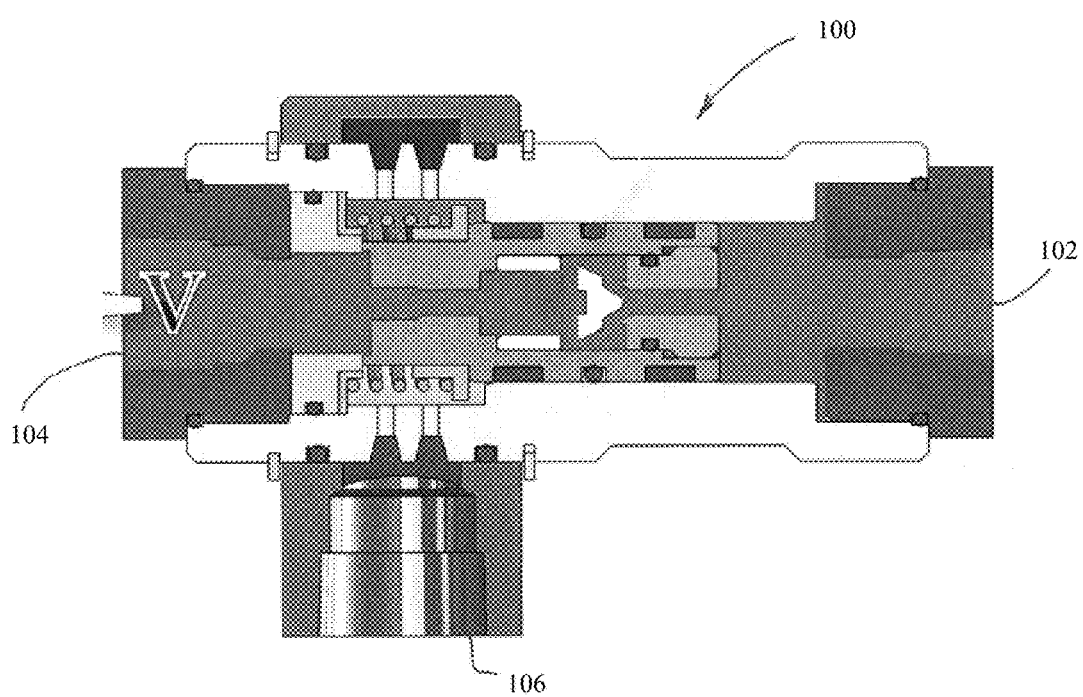

Referring to FIGS. 1A-1D, the varied states and operation of a quick-vent valve assembly 100 for use with embodiments of the present disclosure can be described. In FIGS. 1A-1D, quick-vent valve assembly 100 is shown in three different functional positions relative to the operation and fluid communication through its inlet 102, outlet 104, and vent port 106. As shown, FIGS. 1A and 1B depict quick-vent valve assembly 100 in a fully-closed position with its outlet 104 and vent port 106 in communication with each other and its inlet 102 blocked. FIG. 1C depicts quick-vent valve assembly 100 in a partially open position with its inlet 102, outlet 104, and vent port 106 all blocked. Finally, FIG. 1D depicts quick-vent valve assembly 100 in a fully open position with its inlet 102 and outlet 104 in fluid communication and vent port 106 blocked.

In operation, quick-vent valve assembly 100 operates to block vent 106 and allow pressurized hydraulic fluid present at inlet 102 to be transmitted to outlet 104 when a pre-determined flow pressure is achieved at inlet 102. As shown, quick-vent valve assembly 100 may be a model No. 1190-00 R0 "Quick Dump Valve" available from Schoolhill Hydraulic Engineering Co Ltd in Aberdeen, Scotland. However, those having ordinary skill in the art will appreciate that alternative designs and configurations for quick-vent valve assembly 100 may be used instead without departing from the scope of the subject matter described and claimed below. Nevertheless, quick-vent valve assembly 100 is able to shift between the three operation modes depicted in FIGS. 1A, 1C, and 1D depending on the amount of pressure applied to inlet 102. At or slightly above a first or "threshold" pressure at inlet 102, quick-vent valve assembly 100 moves from the fully closed position of shown in FIGS. 1A and 1B to the partially open position shown in FIG. 1C. At or above a second or "opening" pressure at inlet 102, quick-vent valve assembly 100 moves from the partially open position of FIG. 1C to the fully-open position shown in FIG. 1D. As pressure is reduced at inlet 102 below the opening pressure (but maintained above the aforementioned threshold pressure), fluid communication between outlet 104 and inlet 102 is blocked and vent port 106 remains isolated from outlet 104 as shown in FIG. 1C. However, as pressure at inlet 102 is reduced further below the predetermined threshold pressure, fluid pressure at outlet 104 is allowed to communicate or "vent" through vent port 106 as shown in FIG. 1B. Thus, as fluid pressure is reduced below the predetermined threshold pressure, pressure at outlet 104 is vented to vent port 106, regardless of the pressure state at inlet 102.

Therefore, quick-vent valve assembly 100 of FIGS. 1A-1D may be useful where quick variations in pressure at inlet 102 are desired to rapidly switch on and off devices hydraulically connected at outlet 104. For example, in one embodiment, a downhole shutoff valve may be desired to operate between zero and 6 MPa (870 psi). By using a quick-vent valve assembly 100 in accordance with the present disclosure having a predetermined threshold pressure of 5.8 MPa (840 psi) and an opening pressure of 6 MPa (870 psi), a slight (0.2 MPa, 30 psi) drop in pressure at inlet 102 may rapidly vent the remaining 5.8 MPa pressure at outlet 104 to vent port 106, while maintaining the 5.8 MPa supply pressure at inlet 102. Thus, slight drops in pressure at inlet 102 can effectuate large and rapid pressure reductions at outlet 104. As such, when it is desired to re-actuate the downhole shutoff valve, the pressure in the supply or "signal" line at inlet 102 need only be increased slightly again from the threshold 5.8 MPa pressure back to (or above) the 6.0 MPa opening pressure, allowing the system to not only be quickly vented, but also quickly recovered using small, incremental changes in supply pressure at inlet 102. Those having ordinary skill in the art will appreciate that the above pressures are merely representative, and that any combination of pressures may be used.

As such, referring initially to FIG. 1A, quick-vent valve assembly 100 is shown in the fully-closed position. As described above, quick-vent valve assembly 100 includes an inlet 102, an outlet 104, and a vent port 106. Additionally, a vent boss 108 is shown mounted about an outer profile of a vent body 110 in such a manner as to allow 360° of position adjustment of the vent boss 108 (and associated vent port 106) about the axis of valve body 110 extending between inlet 102 and outlet 104. Valve body 110 defines a plurality of inner chambers, including vent chamber 112 and cylinder 114 through which a piston 116 reciprocates. A plurality of circumferential apertures 118 permit fluid in vent chamber 112 to communicate with vent port 106 regardless of the relative rotational position of boss 108 with respect to valve body 110.

As depicted in FIG. 1A, valve assembly 100 is shown in a fully-closed and inactive state such that outlet 104 and vent port 106 are in fluid communication with each other and inlet 102 is blocked from communication with either outlet 104 or vent port 106. To accomplish this state, a main spring 120 biases piston 116 towards inlet 102 and prevents piston 116 from blocking vent chamber 112 and vent port 106. Additionally, as shown, a check valve 122 prevents fluids from flowing from outlet 104 or vent port 106 through a bore 124 of piston 116 to inlet 102. A spring 126 of check valve 122 restricts flow from inlet 102 to outlet 104 or vent port 106 unless a pressure of fluid in inlet 102 exceeds a predetermined threshold value determined by the amount of spring force provided by spring 126.

In selected embodiments, spring constants of check valve spring 126 and main spring 120 are specified such that as a fluid pressure is increased in inlet 102, such pressure acting upon piston face 128 will first displace piston 116 to block vent chamber 112 (as shown in FIG. 1B) before displacing the spring 126 of check valve 122 to allow flow from inlet 102 to outlet 104. As described above, the selection of springs 120 and 126, in conjunction with the geometry of piston face 128 and check valve 122 will determine the opening and threshold pressure values for quick-vent valve assembly 100. As such, the pressure above which piston 116 is thrust against main spring 120 to block vent port 106 corresponds to the aforementioned threshold pressure, and the pressure above which check valve 122 opens against check valve spring 126 corresponds to the aforementioned opening pressure. Depending on the particular operating pressure desired for the device(s) hydraulically connected to outlet 104, the spring constant values for main spring 120 and check valve spring 126 may be varied.

Figure 2A:
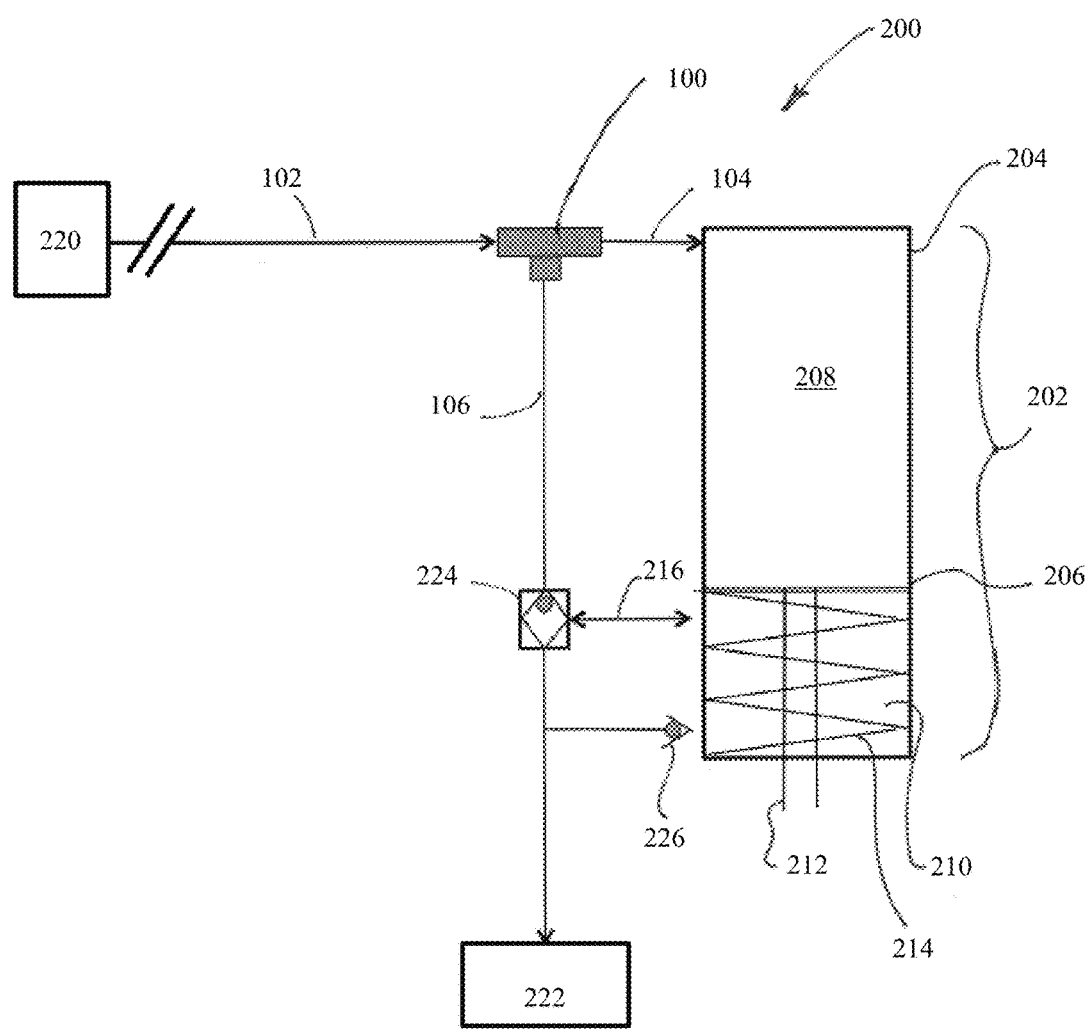
FIGS. 2A through 2C schematically show a valve system incorporating a quick-vent valve in accordance with a first embodiment of the present disclosure.
Figure 2B:
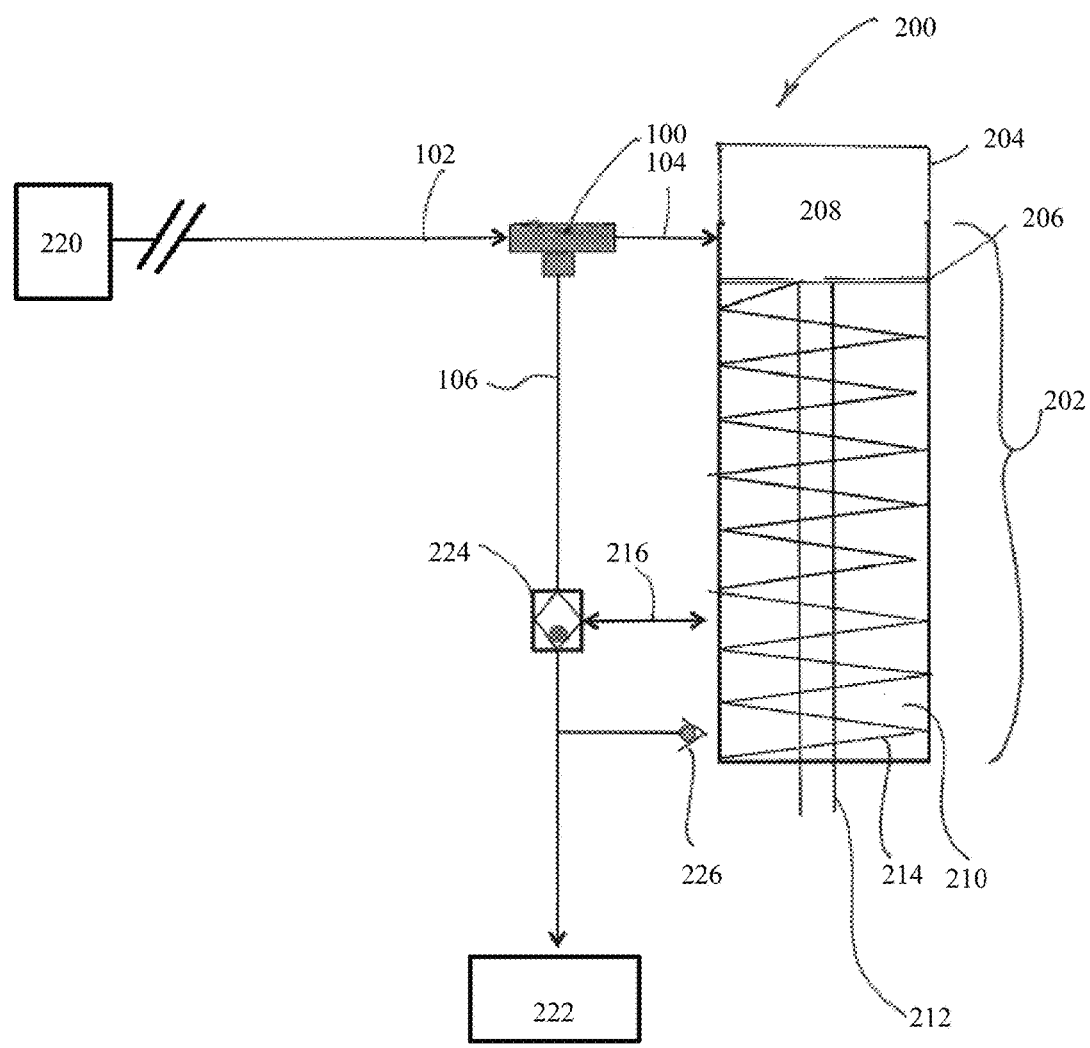
Figure 2C:
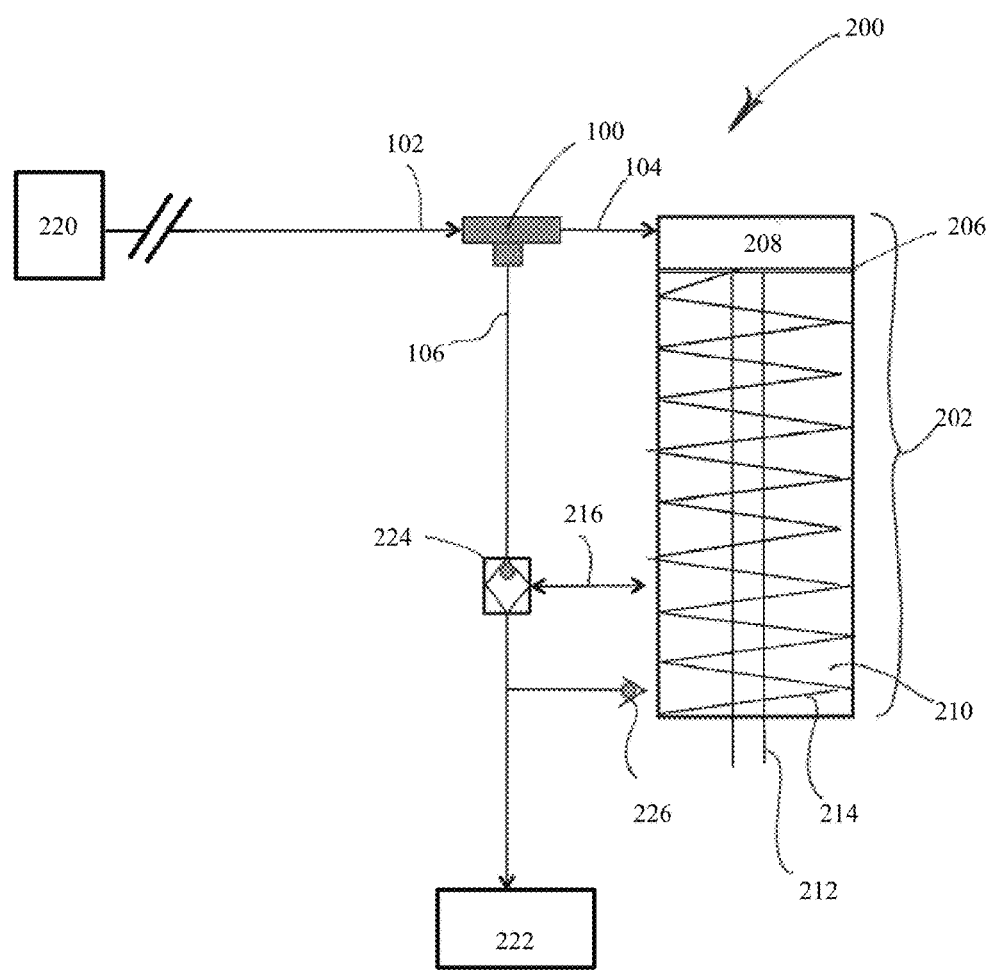

Referring now to FIGS. 2A-2C, a valve system 200 to remotely and directly operate a hydraulic valve 202 using a quick-vent valve assembly 100 is shown schematically. While the valve system 200 will be described in the context of controlling a shutoff valve (202), it should be understood by those having ordinary skill in the art that the same system (200) may be used to control other types of hydraulic valves and in alternative applications. For example, a production shutoff valve requiring 1 L of displacement may be controlled using valve system 200, as well as an incremental "stepper" valve displacing only 50 mL for each stroke in controlling, for example, a hydraulic choke. Additionally while valve system 200 is depicted as using quick-vent valve assemblies 100 described in FIGS. 1A-1D, it should be understood by those having ordinary skill in the art that other designs and configurations of such "quick-vent" valves may be used as well.

As shown in FIG. 2A, schematic valve system 200 is shown connected to a shutoff valve assembly 202 in a fully "open" or operating position. As shown in FIG. 2B, schematic valve system 200 is shown connected to shutoff valve assembly 202 as it is being closed. Finally, as shown in FIG. 2C, schematic valve system 200 is shown connected to shutoff valve assembly 202 in a fully "closed" position. As will described in further detail below, valve system 200 includes a remote hydraulic control system 220 to transmit a hydraulic signal or control pressure to inlet 102 of quick vent valve assembly 100. Output 104 of quick-vent valve assembly 100 is positioned relatively proximate to and in hydraulic communication with a first hydraulic chamber 208 of a hydraulic valve or actuator assembly 202 such that a piston 206 connected to a linkage 212 thereof may operate a valve or other remote device connected thereto. A hydraulic accumulator or "seachest" 222 is in hydraulic communication with the vent port 106 of the quick-vent valve assembly 100 so that discharge pressure from valve assembly 202 may be rapidly vented near valve assembly 202.

Referring to FIGS. 2A-2C, valve assembly 202 includes a hydraulic cylinder 204 in which a piston 206 is allowed to reciprocate between a first hydraulic chamber 208 and a second hydraulic chamber 210. A piston rod 212 acts as a mechanical linkage to connect piston 206 to the portion (not shown) of valve assembly 202 that is manipulated to shutoff (or otherwise control) flow to the wellbore. Thus, piston rod 212 may be connected, directly or indirectly, to a valve ball, gate, etc., depending on the particular type of valve being operated. A spring 214 biases piston 206 (and attached rod 212) in a direction toward the first hydraulic chamber 208 or, in the case of a "failsafe" shutoff valve, the closed position of valve assembly 202. Thus, in the event of a total loss of operating pressure, shutoff valve assembly 202 will default to close the valve mechanism mechanically connected to piston rod 212. Spring 214, which may be of any design, type, and configuration known to those having ordinary skill in the art, will desirably be specified having sufficient spring constant to provide sufficient force to close valve assembly 202 without hydraulic assistance.

Additionally, schematic valve system 200 of FIGS. 2A-2C includes a remote hydraulic control system 220 to supply pressurized hydraulic fluid "signals" to inlet 102 of quick-vent valve assembly 100 and a subsea hydraulic accumulator or "seachest" 222 in communication with the vent port 106 of quick-vent valve assembly 100. Additionally, in selected embodiments, a shuttle valve 224 in communication with the second hydraulic chamber 210 may be positioned between the hydraulic accumulator 222 and, in selected embodiments, a check valve 226 may be connected between the second hydraulic chamber 210 and the hydraulic accumulator 222. In yet another alternative embodiment (FIGS. 3A and 3B, discussed below), an orifice plate 324 may be used in place of shuttle valve 224.

Referring now specifically to FIG. 2A, operation of the schematic valve system 200 to open valve assembly 202 will be described. As shown, outlet 104 of quick-vent valve assembly 100 is hydraulically coupled to first hydraulic chamber 208 such that pressure applied to inlet 102 of quick-vent valve assembly 100 from control system 220 in excess of the predetermined opening pressure acts upon a face of piston 206 and thrusts it down cylinder 204 toward second hydraulic chamber 210. As shown, hydraulic control system 220 is shown schematically, but those having ordinary skill will appreciate that control system 220 may be located geographically distant from the remaining components of system 200, and may be connected to quick-vent valve assembly 100 through a single hydraulic line, such as, for example, a hydraulic capillary tube or a single member of a bundle of hydraulic control lines commonly referred to as an "umbilical." As such, the umbilical cable extending from the location of control system 220 to the rest of system 200 may desirably contain hydraulic control lines to operate several valves (e.g., quick-vent valve assembly 100) at a single or multiple locations, and may also comprise other signal conduits (e.g., electrical, fiber-optic, or hydraulic) to not only operate valves, but also send and receive electrical signals and or monitor wellhead conditions.

Regardless of specific configuration, a hydraulic signal may be sent from control system 220 through a single hydraulic conduit to inlet 102 of quick-vent valve assembly 100 of sufficient pressure (i.e., in excess of the "opening" pressure of quick-vent valve assembly 100) to fully open quick-vent valve assembly 100 and enter first hydraulic chamber 208 through outlet 104 so that piston 206 may be fully displaced. As piston 206 is displaced, spring 214 is compressed and hydraulic fluid contained within second hydraulic chamber 210 is allowed to escape into hydraulic accumulator 222 through check valve 226 or shuttle valve 224. Because quick-vent valve assembly 100 may be configured to block its vent port 106 from inlet 102 and outlet 104 when in the fully open position, the displaced fluid from second hydraulic chamber 210 is diverted into hydraulic accumulator 222.

In another embodiment, second hydraulic chamber 210 may be constructed as an "open" chamber such that only seawater is drawn into and out thereof, such that venting of hydraulic fluid therefrom is not necessary. However, in embodiments using hydraulic accumulator 222, the accumulator is configured to store and dispense hydraulic fluid up to a predetermined pressure and capacity, depending on the preferences of the system designer. In select embodiments, hydraulic accumulator 222 may be constructed as an "open" system, in which the excess capacity of the accumulator 222 is ejected to the subsea environment as it reaches its maximum capacity or pressure. As would be understood by those having ordinary skill, such an open system would only be feasible if the working hydraulic fluid being used is water soluble, not toxic, and permitted (by regulators) to be released to the marine environment. Alternatively, hydraulic accumulator 222 may be constructed as a "closed" system whereby excess capacity of hydraulic fluid is vented via an additional hydraulic line (not shown) to an alternative storage or collection facility. In one embodiment, an accumulator or seachest vent line may be included in the umbilical such that the remote location containing the control system 220 may also include a hydraulic fluid collection and disposal or recycling facility.

Referring now to FIG. 2B, operation of the schematic valve system 200 to close valve assembly 202 will be described. As depicted in FIG. 2B, valve assembly 202 is in the middle of a closing operation and is shown partially open. To close valve assembly 202, the pressure at inlet 102 of quick-vent valve assembly 100 is reduced by control system 220 below the opening and threshold pressure such that piston (116 of FIG. 1A) of quick-vent valve assembly 100 retracts within body (110 of FIG. 1A) to unblock vent port 106. Thus, as shown in FIG. 1B, pressurized hydraulic fluid is permitted to flow from outlet 104 connected to first hydraulic chamber 208 and into vent port 106 of quick-vent valve assembly 100. As spring 214 thrusts piston 206 from second hydraulic chamber 210 toward first hydraulic chamber 208, pressurized fluid escaping first hydraulic chamber 208 is diverted through outlet 104 and vent 106 toward shuttle valve 224. As pressurized fluid from vent port 106 of quick-vent valve assembly 100 interacts with shuttle valve 224, the mechanism of shuttle valve 224 blocks flow therefrom to hydraulic accumulator and permits the fluid to enter second hydraulic chamber 210 through equalization line 216. Thus, rather than "dump" fluid from first hydraulic cylinder 208 to hydraulic accumulator 222 or to a waste port, the pressurized fluid is permitted to fill second hydraulic chamber 210 and "balance" the chambers of valve assembly 202. While fluid exiting first hydraulic chamber 208 is "balanced" into the second hydraulic chamber 210, shuttle valve 224 and check valve 226 prevent fluid from hydraulic accumulator 222 from entering second hydraulic chamber 210 of valve assembly 202.

Referring now to FIG. 2C, schematic valve system 200 is shown in a fully-closed position. As shown, piston 206 has been fully thrust closed by spring 214 and all excess fluid from first hydraulic chamber 208 has been diverted through outlet 104 to vent port 106 and through equalization line 216 and into second hydraulic chamber 210. As the pressure of fluid from first hydraulic chamber 208 is reduced, the stored hydraulic pressure of fluid contained within hydraulic accumulator 222 interacts with shuttle valve 224 such that the fluid from hydraulic accumulator 222 may flow through equalization line 216 and into second hydraulic chamber 210, if needed. Following closure of valve assembly 202 (as shown in FIG. 2C), second hydraulic chamber 210 contains hydraulic fluid in communication with and at the pressure of hydraulic accumulator 222, and hydraulic pressure in inlet line 102 extending from remote control system 220 to quick-vent valve assembly 100 can be maintained at a level just below the predetermined threshold pressure. Thus, while first hydraulic chamber 208 may exist in a zero or low pressure state, only an incremental increase in pressure of inlet 102 line is needed to again open quick-vent valve assembly 100 so that a valve mechanism connected to piston rod 212 may be re-opened much faster than if pressure in inlet 102 had to be increased from a corresponding zero or low pressure state by control system 220 located a significant distance away.

Therefore, in using quick-vent valve assembly 100, valve system 200 may be used to more quickly open and close a connected valve mechanism directly from a great geographic distance than previously possible. Because various regulatory and industry standards dictate the speed in which such subsea valves (e.g., emergency shutoff valves) must be remotely operated from fully open to fully closed, embodiments presented herein advantageously permit such manipulation within the aforementioned standards over much greater distances, and with much smaller hydraulic lines than previously possible. Ordinarily, such "stroke time" depends not only on the viscosity of the working hydraulic fluid, but also on the length and inner diameter of the fluid line through which the fluid flows. Thus, outlet 104, vent port 106 and equalization line 216 may be sized sufficiently large to allow rapid closure of valve assembly 202 upon receipt of a reduced pressure "signal" from control system 220 in communication with a relatively small conduit in communication with inlet 102. Thus, embodiments of the present disclosure permit not only more rapid actuation and closure of connected valve mechanisms, but also a reduction in the overall size of an umbilical traveling to the wellhead site from the remote control system 220. Embodiments disclosed herein advantageously permit closure rates well below the 2.75 minute safety standard popular in subsea wellhead installations, as well as the rapid stroking of valve mechanisms used to operate stepped actuator production chokes and the like.

Figure 3A:
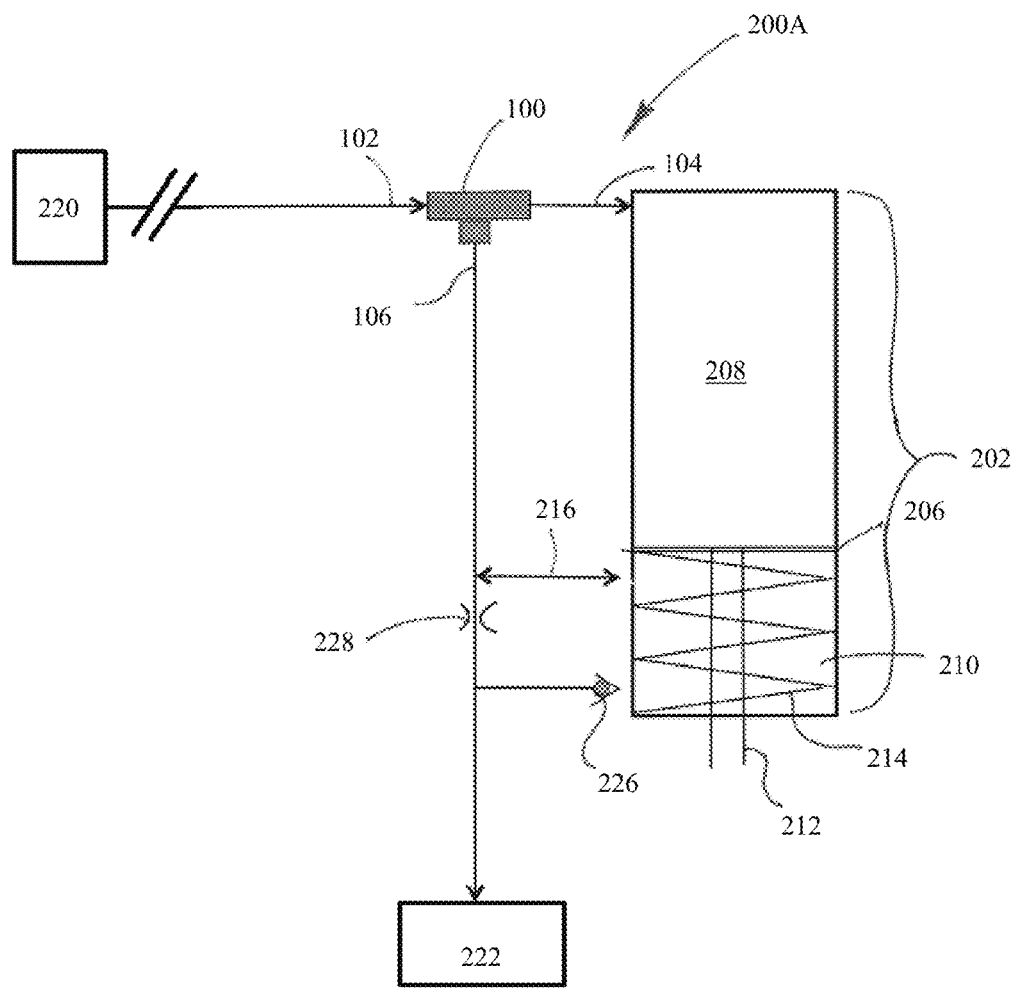
FIGS. 3A and 3B schematically show a valve system incorporating a quick-vent valve in accordance with a second embodiment of the present disclosure.
Figure 3B:
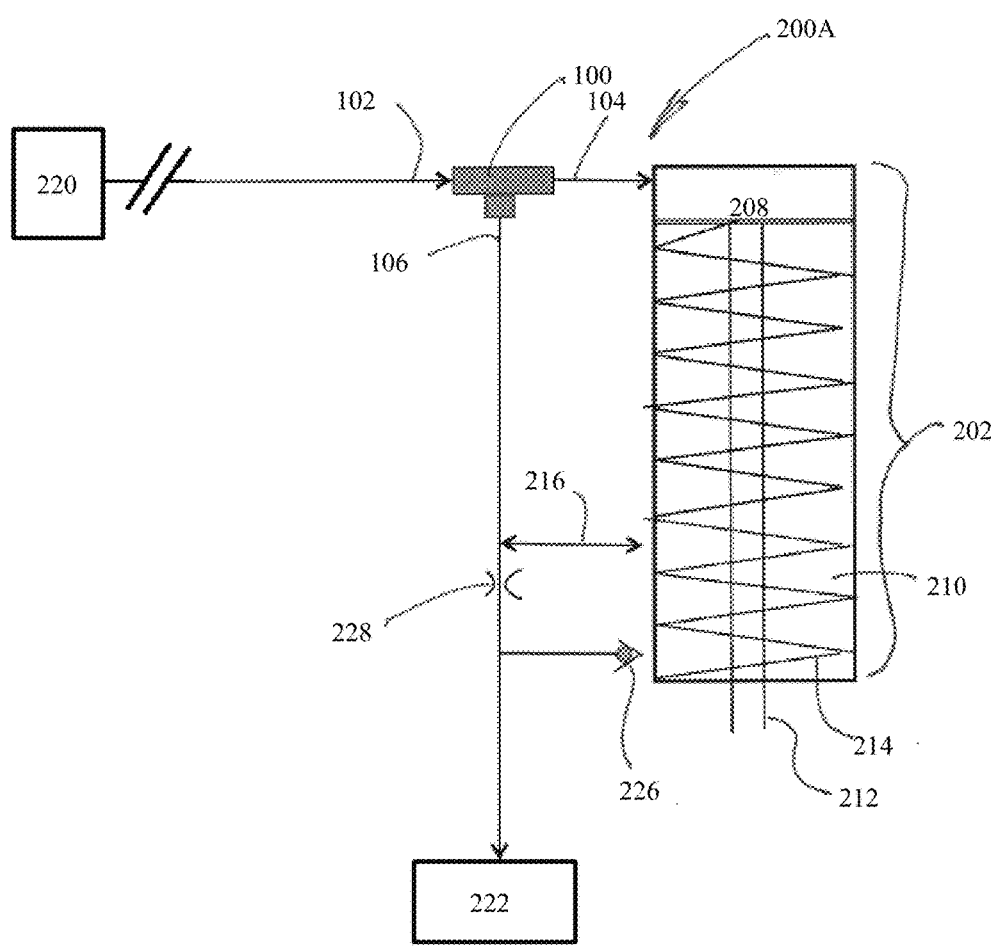

Referring briefly to FIGS. 3A and 3B, another arrangement for a valve system 200A is shown. Valve system 200A of FIGS. 3A and 3B differs from valve system 200 of FIGS. 2A-2C in that shuttle valve 224 of former system 200 is replaced by an orifice plate 228 in system 200A. In place of shuttle valve 224 of FIGS. 2A-2C, orifice plate 228 provides a flow restriction between hydraulic accumulator 222 and equalization line 216. Those having ordinary skill in the art will appreciate that a variety of flow restriction devices may be used in place of orifice plate 228 (FIGS. 3A and 3B) or shuttle valve 224 (FIGS. 2A-2C) without departing from the scope of the claimed subject matter below.

During the closing stroke of valve assembly 202 (FIG. 3B), orifice plate restricts flow of hydraulic fluid leaving first hydraulic chamber 208 through outlet 104 and vent port 106 of quick-vent valve assembly 100 such that the flow of fluid from first hydraulic chamber 208 is preferably diverted through equalization line 216 rather than into hydraulic accumulator 222. Whereas shuttle valve 224 of FIGS. 2A-2C performed the task of mechanically selecting the path of equalization line over hydraulic accumulator 222 for pressurized flow from first hydraulic chamber 208, orifice plate 228 accomplishes the same result by making the path of least resistance the second hydraulic chamber 210. Advantageously, the system 200A of FIGS. 3A and 3B is relatively simplified compared to that (200) shown in FIGS. 2A-2C in that an orifice plate is less expensive to source and may require less maintenance than a shuttle valve, an advantage that can be significant depending on the installation depth of valve systems 200 and 200A. As shown, as valve system 200A is opened (FIG. 3A), fluid leaving second hydraulic chamber 210 of valve assembly 202 escapes to the hydraulic accumulator 222 through check valve 226 in the same manner as with valve system 200 of FIGS. 2A-2C.

Figure 4A:
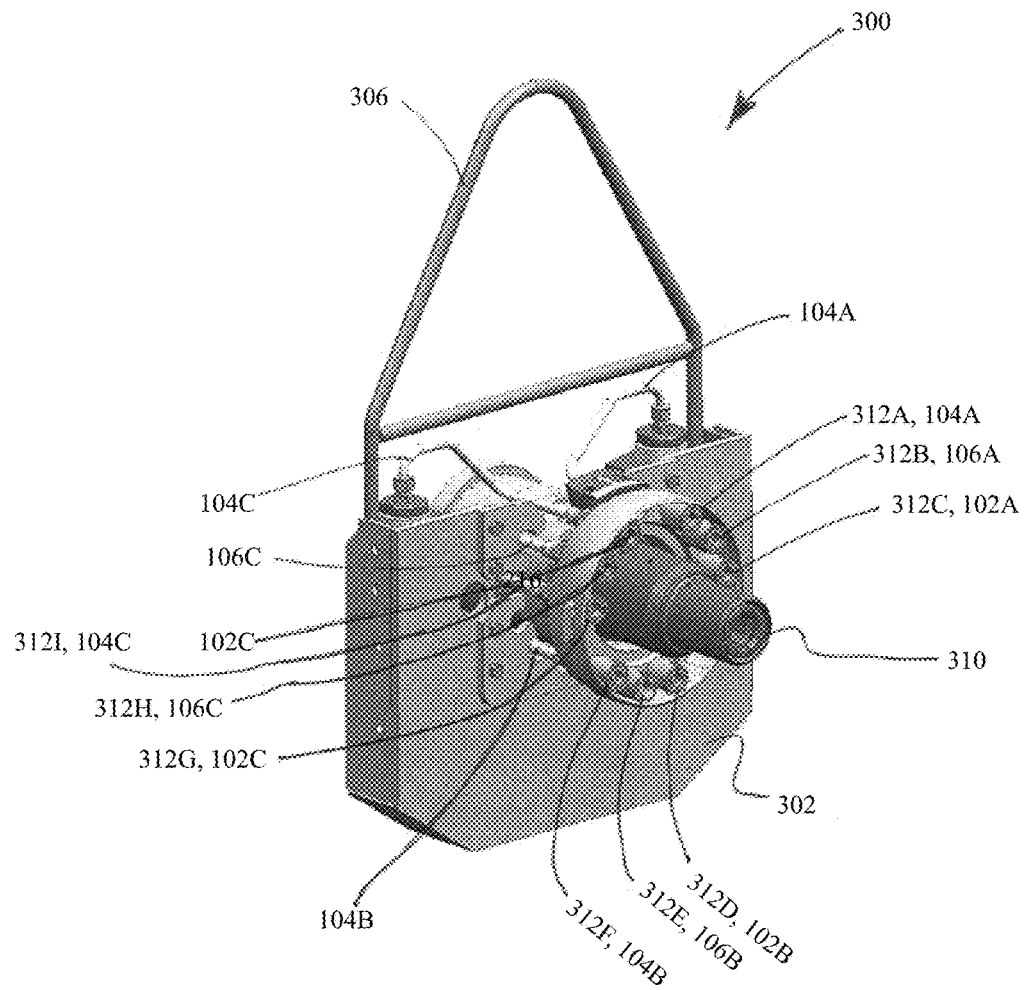
FIGS. 4A through 4C are profiled view drawings of a valve carrier module in accordance with embodiments of the present disclosure.
Figure 4B:
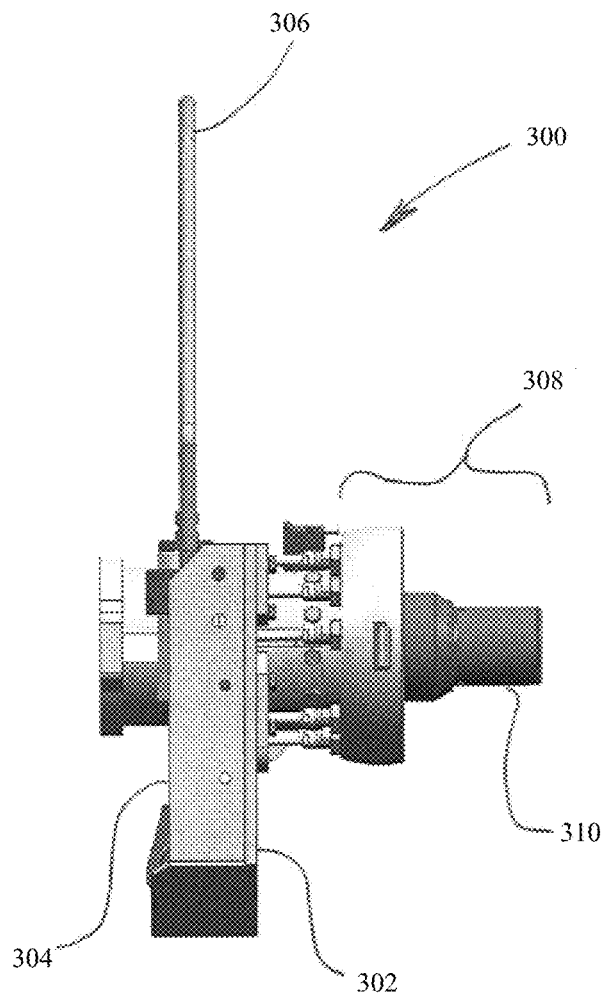
Figure 4C:
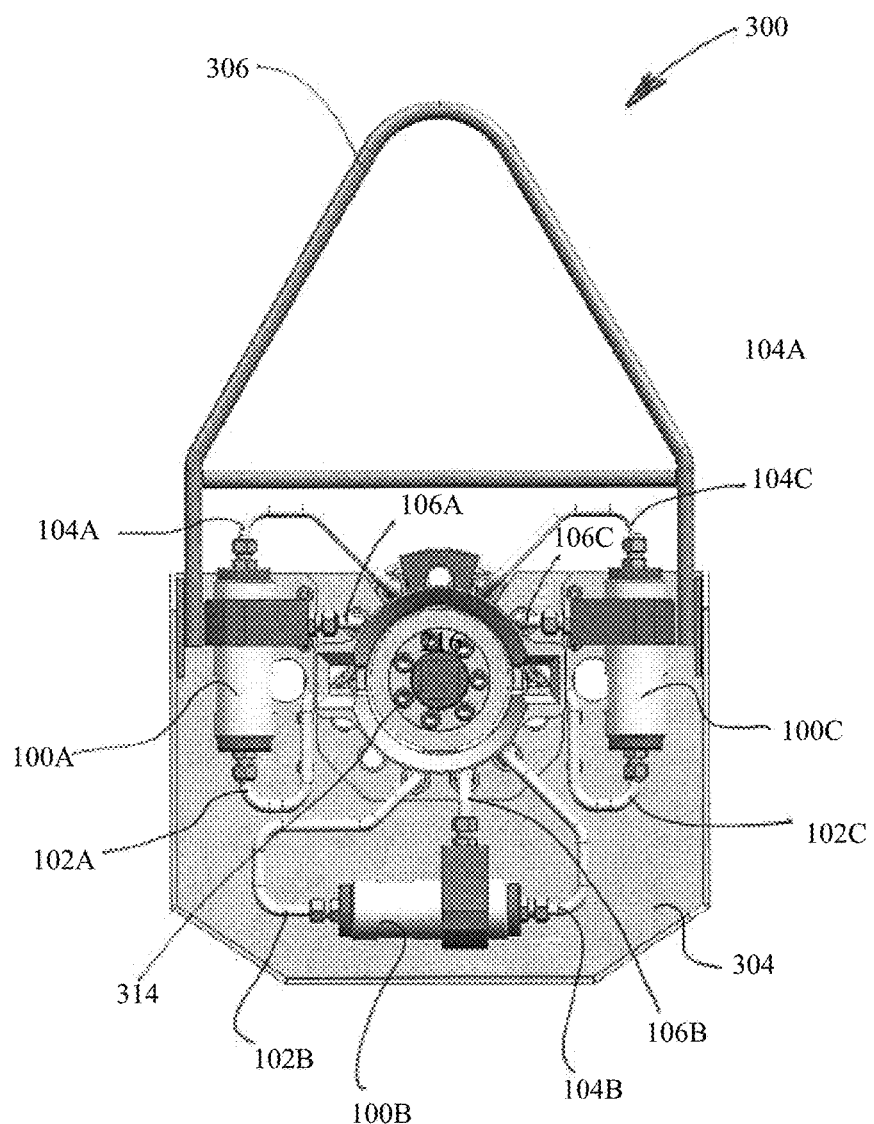

Additionally, a hydraulic control system may be constructed as a two-part system including a fixed portion mounted to the subsea production equipment and a removable modular portion including a valve carrier that may, depending on waterh depth, recoverable with an ROV or diver. Referring now to FIGS. 4A-4C, an valve carrier module 300 capable of being used with embodiments of the present disclosure is shown. In selected embodiments, the valve carrier module 300 may be based on a standard multi-quick-connect design capable of making a simplified "make up" or "break out" connection between a subsea tree and control valves and piping of the type described above in reference to FIGS. 1A through 3B. In selected embodiments, the valve carrier module 300 may be configured to be recoverable and installable (as a module) via a subsea remotely operated vehicle ("ROV") in deep water installations, or through the use of a diver and a maritime crane (e.g., a draw works). Because selected components (e.g., quick-vent valve assembly 100) of the valve systems (e.g., 200, 200A) described above may require periodic maintenance, service, or replacement, a modular "package" such as valve carrier module 300 capable of being relatively quickly and simply disconnected, retrieved, and replaced may be highly desirable.

In selected embodiments, in the event of a failure or scheduled maintenance of a valve system component, a subsea ROV or diver-assisted crane may be used to retrieve the valve carrier module 300 so that it may be replaced with a repaired, updated, or new valve carrier module. For example, should it become desirable to modify the threshold or opening pressures of any valve system, a new valve carrier module 300 may be prepared with the new specifications already in place and simply swapped with the former module 300 with minimal wellhead downtime. Otherwise, absent a retrievable and modular configuration, subsea ROVs or skilled divers might be forced to spend significant amounts of time performing repair or maintenance operations to the subsea tree-mounted valve assemblies. Those having ordinary skill in the oilfield arts will appreciate that because hydrocarbons are unable to be produced while the valve assemblies are being repaired or serviced, any reduction of time required to perform the repair or service can have a beneficial impact on amount of revenue a particular wellhead can produce.

As shown best in FIG. 4B, valve carrier module 300 includes a mating or connection side 302 through which any mechanical or hydraulic connections to the remaining components of the valve system (e.g., 200, 200A) at the subsea tree or wellhead are made, and a work side 304 upon which the actual components to be selectively connected and disconnected from the remainder of valve system are mounted. A lifting feature or handle 306 located atop valve carrier module 300 may be sized of sufficient rigidity and geometry as to allow an ROV to retrieve or install valve carrier module 300 to its location upon the subsea tree or wellhead assembly (not shown) to which it will be hydraulically connected. Referring still to FIG. 4B, a hydromechanical connector assembly 308 is shown including a mechanical connector 310 for selectively attaching and releasing valve carrier module 300 from a corresponding mechanical socket of the adjacent subsea tree or wellhead assembly. A plurality of hydraulic quick-connectors 312 (best viewed as 312A-I in FIG. 4A) surround mechanical connector 310 in a pattern corresponding to a plurality of quick-connector sockets of the subsea tree or wellhead being connected to.

Referring now to FIG. 4C, a subsea locking mechanism configured to latch mechanical connector 310 (and quick-connectors 312A-I) to their counterparts upon the subsea tree or wellhead may be activated by manipulating lock 314 on work side 304 of valve carrier module 300. In selected embodiments, the design of lock 314 is such that it may be easily manipulated using a robotic arm of a subsea ROV. As shown, work side 304 of valve carrier module 300 includes three quick-vent valve assemblies, 100A, 100B, and 100C. While quick-vent valve assemblies 100A-C are depicted to be the type and style disclosed above in reference to FIGS. 1A-1D (and FIGS. 2A-2C and 3A-3B), it should be understood by those having ordinary skill in the art that the specific type and configuration of valves deployed upon valve carrier module 300 may be varied without departing from the scope of the claimed subject matter below.

Thus, quick-vent valve assembly 100A is shown having an inlet 102A, an outlet 104A, and a vent port 106A; quick-vent valve assembly 100B is shown having an inlet 102B, an outlet 104B, and a vent port 106B; and quick-vent valve assembly 100C is shown having an inlet 102C, an outlet 104C, and a vent port 106C. Additionally, in viewing FIGS. 4A and 4C together, it should be understood that connector 312A corresponds to outlet 104A, connector 312B corresponds to vent port 106A, and connector 312C corresponds to inlet 102A. Similarly, connector 312D corresponds to inlet 102B, connector 312E corresponds to vent port 106B, and connector 312F corresponds to outlet 104B. Finally, connector 312G corresponds to inlet 102C, connector 312H corresponds to vent port 106C, and connector 312I corresponds to inlet 102C.

As such, in making one connection between mechanical connector assembly 308 and corresponding structure of a subsea tree or wellhead, a structural connection at mechanical connector 310, and nine fluid connections 312A-I can be made simultaneously to connect three, three-port quick-vent valves 100A-C to a subsea valve system (200, 200A). While FIGS. 4A-C show a valve carrier module 300 having three distinct quick-vent valve assemblies (100A-C), it should be understood that additional, or fewer valves (including additional types of valves) may also be mounted thereupon. As shown, valve carrier module 300 comprising three quick-vent valve assemblies 100A-C may be used to control a single shut-off valve and a single step-actuated production choke for a particular subsea production string. For example, quick-vent valve 100A may control the shut-off valve for the production string, with quick-vent valves 100B and 100C, respectively, controlling the "open" and "close" incremental stepping functions for the choke of the production string.

At a remote operating location (e.g., 220 of FIGS. 2A-2C), the control of the production shutoff valves and choke may be controlled by a surface interface control panel. In selected embodiments, the surface interface control panel may provide an operator with a reliable interface to open and close the shutoff valve and production choke located at a distal end of the umbilical connecting the control panel (and hydraulic power source) to the subsea valve assemblies (e.g., 200, 200A). As such, the surface interface control may include programmable logic circuitry ("PLC") to display and set the position of a subsea production choke connected to the subsea tree. Additional hydraulic components (e.g., hydraulic power units, manifolds, valves, supply tanks, umbilical connectors, etc.) may be used to transmit the hydraulic "signals" to the quick-vent valve assemblies (100) located proximate to the valves (shutoff, choke, or other) to be controlled. An electrical signal path conduit (e.g., wireline) may connect the surface interface control to devices upon the subsea tree assembly to report back the status and position of the valves to be controlled. Thus, an operator at the surface interface control panel will be able to know, with certainty, if and when the desired control instruction sent from the interface control panel has been received and performed at the subsea tree.

As described above, the subsea production choke may operate based upon a series of hydraulic "pulses" supplied by the quick-vent valve assemblies to open or close the production choke a preset increment for each pulse. In selected embodiments, each pulse in either the opening or closing signal direction will selectively open or close the production choke ⅓ of one "step" of the maximum amount of choke position, such that, for example, a choke having 55 "steps" would require 165 pulses from the "open" signal quick-vent hydraulic valve would be required to operate the production choke from a fully closed (i.e., 100% closed) to a fully open (i.e., 0% closed) position. In another example, a check moving ⅓ of 1% for each pulse may require 300 pulses to move from a fully closed (i.e., 100% closed) to a fully open (i.e., 0% closed) position. In using the PLC of the surface interface control panel, the degree of opening (or closing) of the subsea production choke that is desired may be selected by the operator, leaving the circuitry of the surface interface control to send the necessary amount of pulses to the valve assembly through the directly hydraulically-connected umbilical at a rate within the design parameters of the system. In selected embodiments, an electrical signal path extending from the surface interface control panel to the subsea tree assembly may provide feedback (i.e., closed loop) to the PLC so that the system may wait until a pulse is detected (and acted upon) by the production choke before the next pulse is sent.

Advantageously, embodiments disclosed herein permit more precise and rapid direct control of subsea hydraulic control valves that was formerly possible. As hydraulic umbilical lengths increase beyond 1.5 km in length, the ability to quickly and precisely open and close subsea control valves becomes limited by viscous friction between the hydraulic operating fluid and the inner wall of the hydraulic lines through which they travel. For example, in a hydraulic shutoff valve displacing 1 L or more hydraulic fluid to close a production bore, the time needed to fully close the valve (i.e., have 1 liter of pressurized fluid travel the 1.5 km distance to the control location from the subsea tree) may exceed the desired 2.75 minute safety limit for shutting down a producing well. Additionally, in the case of controlling a production choke using hydraulic pulses, even at relatively small displacements (e.g., 50 mL), the time to transmit such pulses over long distances through small-diameter conduits may be impractical. As such, instead of three pulses per percentage movement as described above, production chokes having less resolution (e.g., 1 pulse per percentage movement) may be specified instead, thereby offering less resolution (i.e., less precise control of production flow) than using systems in accordance with embodiments presented herein. Because the pressure fluctuation (i.e., opening pressure, threshold pressure) is able to travel across a hydraulic capillary line at great distances faster than the actual flow of hydraulic fluid, valve assemblies (200, 200A) using quick-vent valves (100) advantageously allow more precise and rapid control of subsea valves, resulting in increased safety.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An apparatus to control a remote device, the apparatus comprising:
   a valve assembly comprising a cylinder, a piston dividing the cylinder into a first hydraulic chamber and a second hydraulic chamber, a spring to bias the piston toward the first hydraulic chamber, and a linkage to connect the piston to the remote device;
   a quick-vent valve assembly comprising an inlet connected to a hydraulic source, an outlet connected to the first hydraulic chamber such that a pressure from the hydraulic source connected to the inlet acts on a face of the piston in the first hydraulic chamber of the valve assembly when the pressure at the inlet is greater than an opening pressure value of the quick-vent valve assembly, and a vent port, wherein the quick-vent valve assembly is configured to discharge fluid from the outlet to the vent port when the pressure of the hydraulic source connected to the inlet drops below a threshold value;
   a vent line connecting the vent port of the quick-vent valve assembly to a hydraulic accumulator; and
   an equalization line to connect the second hydraulic chamber to the vent line.

2. The apparatus of claim 1, further comprising a flow restriction device in the vent line positioned between the vent port and the hydraulic accumulator.

3. The apparatus of claim 2, wherein the flow restriction device comprises a shuttle valve.

4. The apparatus of claim 2, wherein the flow restriction device comprises an orifice plate.

5. The apparatus of claim 2, further comprising a hydraulic connection between the second hydraulic chamber and the vent line, wherein the hydraulic connection is positioned in the vent line between the flow restriction device and the hydraulic accumulator.

6. The apparatus of claim 5, further comprising a check valve to prevent flow from the vent line through the hydraulic connection to the second hydraulic chamber.

7. The apparatus of claim 1, wherein the remote device comprises a production shutoff valve.

8. The apparatus of claim 1, wherein the remote device comprises a production choke.

9. The apparatus of claim 1, wherein the remote device is located in a subsea environment.

10. The apparatus of claim 1, wherein the remote device is located more than 1.5 km away from the hydraulic source.

11. The apparatus of claim 1, wherein the second hydraulic chamber is open to a surrounding environment.

12. The apparatus of claim 1, wherein the hydraulic accumulator comprises a seachest.

13. The apparatus of claim 1, wherein the hydraulic accumulator comprises a vent to release excess volume of the hydraulic fluid.

14. A modular valve carrier to engage and complete a subsea valve assembly, the modular valve carrier comprising:
   an engagement portion on a connection side of the modular valve carrier comprising a mechanical connector and a plurality of hydraulic quick-connectors, wherein the engagement portion is configured to engage a corresponding socket of the subsea valve assembly;
   a plurality of quick-vent valve assemblies disposed on a work side of the modular valve carrier, each of the plurality of quick-vent valve assemblies comprising an inlet, an outlet, and a vent port, each inlet, outlet, and vent port hydraulically connected to one of the plurality of hydraulic quick-connectors; and
   a lifting feature configured to be manipulated by a remotely operated vehicle;
   wherein the connection side and the work side are opposite to each other;
   wherein each of the plurality of the quick-vent valve assemblies is configured to discharge fluid from the outlet to the vent when a pressure of the hydraulic source connected to the inlet drops below a threshold value.

15. The modular valve carrier of claim 14, further comprising a lock mechanism configured to selectively lock the engagement portion with the socket of the subsea valve assembly.

16. The modular valve carrier of claim 15, wherein the lock mechanism is configured to be operated by the remotely operated vehicle.

17. The modular valve carrier of claim 14, wherein the socket of the subsea valve assembly comprises a plurality of corresponding hydraulic quick-connector sockets configured to hydraulically couple with the plurality of hydraulic quick-connectors of the engagement portion.

18. A method to control a remote device, the method comprising:
   linking the remote device to a piston configured to reciprocate between a first hydraulic chamber and a second hydraulic chamber of a cylinder;
   hydraulically coupling an outlet of a quick-valve assembly to the first hydraulic chamber;
   supplying a hydraulic fluid from a hydraulic source to an inlet of the quick-vent valve assembly;
   increasing pressure of the hydraulic fluid at the inlet of the quick-valve assembly beyond an opening pressure;
   thrusting the piston from the first hydraulic chamber to the second hydraulic chamber and venting hydraulic fluid from the second hydraulic chamber to a hydraulic accumulator when the pressure of the hydraulic fluid at the inlet is increased beyond the opening pressure to operate the linked remote device; and
   venting hydraulic fluid from the first hydraulic chamber to the hydraulic accumulator through a vent port of the quick-vent valve assembly and venting hydraulic fluid from the first hydraulic chamber to the second hydraulic chamber through the vent port of the quick-vent valve assembly when pressure of the hydraulic fluid at the inlet drops below a threshold value to thrust the piston from the second hydraulic chamber to the first hydraulic chamber.

19. The method of claim 18, wherein the remote device comprises a subsea production shutoff valve.

20. The method of claim 18, wherein the remote device comprises a subsea production choke.

21. The method of claim 18, further comprising biasing the piston toward the first hydraulic chamber.

* * * * *